United States Patent [19]
Howard et al.

[11] Patent Number: 6,138,442
[45] Date of Patent: Oct. 31, 2000

[54] PACKAGING MACHINE WITH CONTINUOUS SEALING JAW MOVEMENT

[75] Inventors: William S. Howard, Lilburn, Ga.; John C. Harston, North Somerset, United Kingdom; John A. Messenger, Alpharetta, Ga.

[73] Assignee: Kliklok Corporation, Decatur, Ga.

[21] Appl. No.: 09/307,251

[22] Filed: May 5, 1999

Related U.S. Application Data

[60] Provisional application No. 60/104,036, Oct. 13, 1998.

[51] Int. Cl.[7] ................................. B65B 51/10
[52] U.S. Cl. .................. 53/477; 53/373.7; 53/375.9; 53/551
[58] Field of Search .................. 53/450, 550, 551, 53/451, 552, 477, 373.7, 375.9

[56] References Cited

U.S. PATENT DOCUMENTS

| | | |
|---|---|---|
| 3,522,689 | 8/1970 | Wylie et al. . |
| 3,629,987 | 12/1971 | Klopfenstein . |
| 3,850,780 | 11/1974 | Crawford et al. . |
| 4,120,235 | 10/1978 | Beck et al. . |
| 4,199,919 | 4/1980 | Moscatelli . |
| 4,516,379 | 5/1985 | Iain . |
| 4,524,567 | 6/1985 | Patelli . |
| 4,663,917 | 5/1987 | Taylor et al. . |
| 4,771,142 | 9/1988 | Spinner . |
| 4,838,981 | 6/1989 | Fioravanti . |
| 4,881,934 | 11/1989 | Harston et al. . |
| 4,947,618 | 8/1990 | Schneider et al. . |
| 5,031,386 | 7/1991 | Schneider . |
| 5,052,166 | 10/1991 | Ziegler et al. . |
| 5,279,098 | 1/1994 | Fukuda . |
| 5,347,795 | 9/1994 | Fukuda . |
| 5,412,927 | 5/1995 | Miyazaki et al. . |
| 5,533,322 | 7/1996 | Bacon et al. ............... 53/550 |
| 5,540,035 | 7/1996 | Plahm et al. ............... 53/550 |
| 5,575,137 | 11/1996 | Metz et al. . |
| 5,622,032 | 4/1997 | Ryan . |
| 5,622,033 | 4/1997 | Fukuda . |
| 5,669,201 | 9/1997 | Simionato . |
| 5,685,131 | 11/1997 | Spatolisano et al. . |
| 5,771,660 | 6/1998 | Loewenthal ............... 53/550 |
| 5,778,641 | 7/1998 | Simionato . |
| 5,870,887 | 2/1999 | Bennett . |
| 5,881,539 | 3/1999 | Fukuda et al. . |

*Primary Examiner*—Eugene Kim
*Attorney, Agent, or Firm*—King and Schickli, PLLC

[57] ABSTRACT

An apparatus for cross sealing a continuously moving plastic tube, such as to form bags for packaging in a form-fill-seal packaging machine is disclosed, along with a related method. The tube is fed continuously between a pair of opposed sealing jaws that move toward and away from each other in a polygonal path. Substantially continuous sealing pressure is provided between the jaws during a sealing pattern of movement along the path, with the remainder of the path including a return pattern of movement away and back towards the sealing zone. Each sealing jaw is carried on a bridge extending between dual gear assemblies. The sealing pattern of movement along the path is substantially linear so as to provide highly efficient sealing. The polygonal path is established by an offset point on an output shaft/pinion; the locus defining the path being selected from the group of hypotrochoids and epitrochoids. To provide the hypotrochoidal path, each gear assembly preferably employs a pinion rotating around the inside of a ring gear with an integer gear ratio, such as 3:1–5:1. For the epitrochoidal path, the pinion is rotating about a fixed sun gear with an idler in between, and may establish the same integer gear ratios. Sliding guide rods between the sealing jaws maintain the jaws parallel during the sealing and return patterns of movement.

26 Claims, 9 Drawing Sheets

Fig. 7d

PACKAGING MACHINE WITH CONTINUOUS SEALING JAW MOVEMENT

RELATED APPLICATION

This is a utility patent application claiming priority based on Provisional U.S. Patent Application Ser. No. 60/104,036 filed Oct. 13, 1998.

TECHNICAL FIELD

The present invention relates to the field of form, fill and seal packaging systems, and more particularly to the broader field of cross sealing a plastic tube wherein the film feeding and sealing jaw motion is continuous to increase the efficiency of the operation.

BACKGROUND OF THE INVENTION

Packaging machines and related methods for forming, filling and sealing flexible, pillow-shaped bags made from a continuous web of packaging film after being formed into a tube are well known. These machines/methods are in wide use to package a variety of loose products, such as snack foods, frozen foods, candies and the like. One of the most successful approaches for forming these bags calls for the use of a continuous, but variable film feed in conjunction with a constant motion oscillating carriage for the stripping/sealing jaws that extend across the feed path of the tube.

The state of the art of this type of prior arrangement includes a sophisticated drive mechanism to oscillate the carriage in a constant, relatively high speed motion. A programmable controller serves to vary the feed of the tube so that an optimum rate of up to 120–140 bags per minute can be successfully obtained in a very reliable manner. The maximum speed of the carriage determines the high output of this machine. The operation of the sealing jaws to form the cross seals of the tube, and all of the other ancillary functions, track the carriage motion through the controller so that the entire packaging process operates in a highly efficient manner. This type of form-fill-seal bagmaker and related method is set forth in several patents assigned to the present applicant, one such patent being entitled "Continuous Vertical Form- Fill-Seal Packaging Machine with constant motion carriage", U.S. Pat. No. 5,533,322, issued Jul. 9, 1996.

While this prior art packaging machine and related method outperforms all other continuous machines that we are aware of on a wide variety of products, especially light weight loose products such as potato chips, there is a need for still higher speed with more efficient cross sealing, including with product stripping. Similar operation advantage is desirable in related endless material handling systems.

While the continuous film feed, such as with opposed feed belts is well established and perfected, for many years others have suggested making bagmakers with sealing jaws that move in a full 360° circular, or modified circular path, so that the sealing jaws do not have to reverse direction at the top and bottom of the tube sealing operation. Some success has been experienced by machines of this type in the past, such as illustrated in the Taylor et al. U.S. Pat. No. 4,663,917, issued May 12, 1987. In this particular arrangement, the sealing jaws are mounted on arms that continuously counter-rotate through 360° in opposite directions around fixed axes. The strippers are extensible and spring loaded. They are guided through forced linear motion that compress the springs as the sealing jaws move through the sealing zone. The cams operating the strippers extend through the return zone of the circle as they continue to compress the springs for a total arc of approximately 270°, whereupon the stripper jaws are released adjacent the upper end of the sealing zone for repeating the cycle. In this manner, a modified D stripping pattern of movement is established. While having some success in the market, there are drawbacks to this approach in that this is a forced, simulated linear motion of the jaws in the sealing zone. The reliance on cams and springs to force the linear motion causes high stresses and excessive noise in the stripping operation. The high noise level of such a machine is due to the clash of the metal cams with the cam followers that is necessary to force the strippers into the simulated linear motion. Furthermore, the excessive frictional forces, in addition to the force required to compress the high spring rate springs, greatly increases the power consumption of the machine.

Other inventors, even some earlier in time than Taylor et al., such as illustrated in the U.S. Pat. No. 3,629,987 to Klopfenstein, have attempted to make successful continuous cross sealing machines for bagmakers going with the same counter-rotating arm concept. In the '987 patent, there is also a reliance on the sealing jaws establishing a true D profile path. To do this, the counter-rotating arms are mounted for bodily movement on a second arm, that is in turn also pivoted. The object is to simulate straight paths so that they move parallel along the sealing zone of the tube. This arrangement is even more highly complicated and expensive to build and maintain. Plant air is required to activate an air cylinder required to pivot the mounting arms during the simulated straight line movement along the sealing zone.

A few years after the Klopfenstein '987 patent was issued was when inventors came up with the predecessor to the Taylor et al. machine. Insofar as we are aware, the first cam actuated modified D- shaped sealing jaw movement is illustrated in the Beck et al. U.S. Pat. No. 4,120,235. While this camming approach is recognized as broadly being the predecessor to the Taylor et al. '917 approach generating the similar D-shaped paths, the motion is generated by laterally positioned moving, rather than stationary, cams, with cam followers being carried by the sealing jaws. As in the successor '917 approach, the cams that are subject to large mechanical stresses, inherently suffer wear and maintenance problems, consume large amounts of power and are subject to noisy operation due to the clashing of mechanical cams/followers and other parts.

As others have entered the field of continuous form-fill-seal packaging, the noticeable pattern of dealing with 360° sealing jaw and/or stripper movement is simply switching back and forth between the camming approach of Taylor et al. '917 and Beck '235 and the moveable axle approach of Klopfenstein '987. Specifically, the latest entry, Fukuda U.S. Pat. No. 5,279,098, simply reverts to the moveable axes approach of the '987 patent. It has enjoyed limited success by reviving this old technology. However, the same complicated mechanism portends excessive wear of parts, high stresses and high maintenance requirements, high power consumption and noisy operation for its future.

Along the way, there have been others that have proposed similar systems utilizing planetary gear arrangements to move sealing jaws in a circular path while maintaining the operative face of the jaws or material handling grippers facing each other. In the Iain U.S. Pat. No. 4,516,379, grippers are used to mechanically close packages, which grippers are maintained in a face-to-face operative orientation while being moved in opposite rotating circles. Again, the substantially linear movement along the gripping zone is not a natural mechanical motion, but it must be forced by overlapping the circles being generated and compressing springs through a substantial distance. In other words, the inventor relies on spring loaded jaws to accommodate the need for simulated linear movement through the gripping zone. This provides still another form of a D-shaped path of movement. A similar approach later is set forth in the Simionato U.S. Pat. No. 5,778,641 in which sealing jaws are maintained parallel and properly oriented during their counter-rotating paths of movement by planetary gear arrangements. The only difference in this approach over the Iain '379 patent is the use of pneumatic cylinders to provide the simulated linear motion and D-shaped paths in the sealing zone. The generation of an epicycloidal motion to keep the sealing jaws properly oriented through the counter-rotating paths is identical to the earlier Iain '379 teaching.

From the foregoing, it is apparent that there is a need for departure from the conventional thinking of the past with regard to continuous motion sealing. In particular, contrary to conventional thinking where inventors have attempted to improve the cross sealing, or related material handling or gripping functions, by using counter-rotating arms on fixed or movable axes, or cam and mechanical/pneumatic spring combinations, with or without planetary gear sets, a complete departure is in order. An entirely new approach is needed that would give increased speeds to form bags at a rate of up to 180–200 bags per minute. What is needed is a simple and efficient natural mechanical movement that obviates the need for these counter-rotating arms, with or without moveable axes and the cam and spring arrangements. Instead the sealing jaws should move substantially effortlessly in counter-rotating paths synchronized with continuous film speed that does not require variation as in the past.

In addition to the more efficient operation that minimizes power input, the direction that we have envisioned results in a compact and easy to drive system, even utilizing a single servo motor for the entire dual sealing jaw movement. An additional key advance being sought is obtaining maximum reliability by using integrated gear assemblies that automatically provide natural, not forced sealing jaw movement, alignment and synchronization. Our approach endeavors to obtain substantially increased linear sealing movement of the sealing jaws or other material handling components within its broadest aspects. It should provide travel through fall, counter-rotating cycles without the use of mounting arms, operating cams, pneumatic cylinders or the like. Our goals include providing a built in self regulating movement through opposed gear assemblies that move the sealing jaws in smooth polygonal paths, rather than the prevalent forced, modified D-shaped paths of the prior art.

Also of substantial advantage would be to create jaw motion in the sealing area that is a substantially straight line and extends over the maximum parallel trajectory in the zone. At the same time, the jaws are to remain in perfect forward orientation facing the plastic tube to be sealed. The extended zone allows better control of the heat and pressure needed to heat seal the plastic tube, or perform other, similar gripping functions. At the same time, a gentle mating of the jaws rather than harsh clashing is desirable, made possible by a slight convexity built into the polygonal path in the sealing zone. At the same time avoiding any need for crucial timing functions brought on by variable film feed speeds is to be avoided. As an additional feature, we are looking for full, unforced mechanical squeeze pressure between the jaws so that reliance on heavy, extended length mechanical springs, pneumatic cylinders or the like, that tend to be weak and variable, can be avoided. In addition, we are looking for insuring a companion full motion, positive stripping action to mate with the sealing jaw movement.

SUMMARY OF THE INVENTION

Accordingly, it is a first object of the present invention to provide a departure from conventional apparatus and method approaches for cross sealing a plastic tube or the like, and overcome the above identified shortcomings of the prior art.

Another object is to provide a system that generates a natural pattern of movement for cross sealing a tube or the like.

It is another object of the present invention to provide a cross sealing system for use in packaging or the like, wherein counter-rotating arms for the sealing jaws are replaced by simple drive components that are directly connected to the sealing jaws through an offset output shaft.

It is still another object of the present invention to provide a cross sealing apparatus/method wherein laterally spaced dual gear assemblies support and move the jaws to define a polygonal path, with one side of the polygon forming a natural, substantially linear sealing pattern of movement in the sealing zone.

In is another object of the present invention to provide such a cross sealing apparatus and method, or the like using continuous 360° motion in order to obtain not only substantially higher speeds, but to do so with minimum power input requirements.

It is still another object of the present invention to create a naturally occurring polygonal path for the sealing jaws to minimize the complexity of the packaging machine and to thereby provide more efficient and reliable operation.

It is still another object of the present invention to provide the cross sealing apparatus/method wherein the natural motion of the gears driving the sealing jaws provides for minimum impact in the sealing zone, and thus reduce power requirement, shock loading and noise.

It is still another object of the present invention to provide maximum sealing jaw squeeze for better sealing and minimize the power input for heat that is needed, as well as reduce the loading and deleterious shock typically found in prior systems.

Still another object is to provide gear assemblies for direct mounting and movement of the sealing jaws to define counter-rotating polygonal paths established by the natural motion of either a hypotrochoid or epitrochoid movement.

Another similar object is to provide a cross sealing apparatus and related method, or the like, incorporating continuous counter rotating motion of the sealing jaws, wherein the support and movement is provided by two sets of laterally spaced dual gear assemblies with low power requirements, preferably driven by a single servo motor.

It is still another object of the present invention to provide dual gear assemblies for supporting and moving sealing jaws in a packaging machine, wherein the sealing jaws move together in a naturally occurring substantially straight line in the sealing zone, but with a slightly convex motion to increase the sealing pressure and minimum closing impact force to provide better sealing, less wear and lower noise.

A further object of the present invention is to provide the sealing jaws that are driven by the dual gear assemblies for rapid introduction into and retraction away from the tube and completed package, respectively to assist in assuring the precision seal formation between the sealing jaws.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

Accordingly, to achieve the foregoing and other objects, and in accordance with the purposes of the present invention as described herein, an improved apparatus, and related method, for use in cross sealing a plastic tube, or related function, is provided. A pair of opposed sealing jaws are supported by two drive units, each including dual gear assemblies and serve to support and actuate the sealing jaws in a novel manner. While the preferred embodiment shown for the purposes of illustrating the present invention is for cross sealing the plastic tube for forming form-fill-seal packages, it is to be understood that within the broadest aspects of the present invention other functions, such as gripping endless material, may utilize the same gear assemblies is contemplated.

In accordance with the embodiments disclosed for illustrative purposes, the sealing jaws are combined with an energy generator for applying heat to the jaws, a feeder for feeding the tube in a continuous manner along the longitudinal path between the jaws and a controller for synchronizing the tube feeding and other ancillary functions with the jaws. To cross seal the tube moving along the path, the two drive units incorporate the dual gear assemblies in compact housings mounted on a typical packaging machine frame (not shown) adjacent the lateral edges of the sealing zone. The movement of the output of the dual gear assemblies is characterized by being in a polygonal path which establishes substantially continuous, firm sealing pressure between the jaws. The sealing zone corresponds to a substantially linear sealing pattern of movement along one side of the polygon. The remainder of the path includes a return pattern of movement with at least one additional linear pattern that takes the sealing jaws efficiently away from and then back towards the tube for the next sealing cycle. As used herein, the term polygon to describe the path of the sealing jaw movement or the like, and its derivatives, means a closed figure bounded by at least two, substantially straight lines connected by relatively small arcs in between. Similarly, when triangle, square, pentagon or like geometric figures are used to describe the effective polygonal paths, it is also to be taken into account that minor arcs connect the substantially straight sides of these figures. Thus, it is the effective or modified, not the pure figures, as shown in the drawings, that is being referenced.

Advantageously, the gear assemblies support and drive the jaws along the polygonal path established by movement of an operative point having a locus to define the desired linear motions of the jaws. The locus of the preferred embodiment is selected from the group of hypotrochoids and epitrochoids, either of which provide the multi-sided path with substantially linear or straight sides and arcuate connectors.

The desired motion for the jaws is generated from mounting directly on offset output shafts of the gear assemblies. Further, the locus established along the sealing pattern of movement is slightly convex toward the sealing zone and each other, to provide gradual engagement, but relatively rapid entry and exit of the sealing jaws to form the pattern. This arrangement allows an increased squeeze pressure at the midpoint, but at the same time minimizes the noise caused by clashing of parts in prior arrangements.

In a preferred embodiment, the polygonal path is a hypotrochoid generated by an operative point offset from the common center line of an output shaft and pinion rotating around the inside of a stationary ring gear. The offset in this embodiment is set at approximately 25% of the pinion radius and the drive ratio of the ring gear to the pinion is an integer relationship, namely 5 to 1. The polygonal path established by tracking the operative point has a locus to define a pentagon with a sealing pattern defining one side, and the return pattern defining the remaining four sides.

In another illustrative embodiment, the offset of the output shaft is at a point approximately 50% of the pinion radius, the drive ratio of the gear to the pinion being 3:1 and the polygonal path being a triangle with a sealing pattern defining one side and the return pattern defining two sides. In still another embodiment, the offset of the output shaft is at a point approximately 40% of the pinion radius, the drive ratio of the gear to the pinion being 4:1 and the polygonal path being a square with a sealing pattern defining one side and the return pattern defining three sides.

Thus as should be clear, with the operative point on the offset output shaft of the gear assembly selected as set forth above, and the ratio of the ring gear to the pinion being a corresponding integer, the desired polygonal path is faithfully produced. With precise adjustment of the operative point as a percentage of the pinion radius, the locus along the sealing/return patterns of the polygon may be adjusted. Advantageously, the inherent nature of the hypotrochoidal movement is what causes the patterns to be given the slight convexity to provide just the right amount of gradual entry and exit of the sealing jaws. This is not only effective to minimize the noise of the jaws coming together for the sealing operation, but also serves to increase the pressure as the center of the sealing pattern is approached. Since the ratio of the pinion carried by the output shaft of the gear assembly and the driving ring gear is an integer, such as 2:1–6:1 or higher, the pinion completes a full rotation relative to the ring gear during each sealing pattern of movement, and from 1–5 or higher, such additional rotations during the return pattern.

In addition to selecting a hypotrochoidal locus or path as a preferred embodiment, the present invention envisions selecting a corresponding epitrochoidal locus as a fully equivalent, substitute embodiment. In this instance, the locus may be generated by an operative point offset from the center of an output shaft and with respect to the radius of a pinion, or planet gear, rotating around the outside of a fixed sun gear. If desired or necessary, an idler planet gear, or idler gear pair, may be interposed between the sun gear and the pinion. The end result is a multiplication of the rotations of the pinion with respect to the smaller sun gear that is an integer; namely, 2:1–6:1 or higher. In the preferred embodiment selected to illustrate utilizing the epitrochoidal path, the gear ratio is also established as 5:1 and the operative point offset from the center of the output shaft/pinion is approximately 25%. As consistent with the hypotrochoidal path, the locus generates a polygon, namely a pentagon, with the sealing pattern defining one side and the return pattern defining the other four sides, all connected by small arcuate connectors.

In order to maintain the sealing jaws in the proper orientation facing the tube to be sealed, at least one guide rod and preferably two, are fixed to one bridge/sealing jaw. The rods extend perpendicular to the feed path. An aligned aperture in the other sealing jaw is provided to slidably receive the rod. This arrangement obviates the need to employ a separate planetary gear system to maintain the sealing jaws parallel during the sealing and return patterns of movement, as typified in the prior art.

In the preferred embodiment, because of the low power requirements as a result of the elimination of forced linear motion along the sealing zone, one servo motor is employed to drive both sets of dual gear assemblies.

There is a related method of cross sealing a continuously moving plastic tube, or in carrying out a similar material handling operation, between a pair of opposed sealing jaws or the like. The steps of this part of the present invention include continuously feeding the tube along a feed path between the jaws, moving the jaws toward and away from each other in a polygonal path to establish substantially continuous sealing pressure between the jaws during a sealing pattern of movement in the sealing zone, and establishing a return pattern of movement away and back towards the tube to complete the polygon. The tube and the jaws is synchronized by a controller. The jaws are energized by the controller for applying controlled heat to seal the plastic tube or the like along the sealing zone. As a result, the jaws are effective to rapidly form multiple seals in sequence across the plastic tube during the repeated sealing patterns of movement.

Consistent with the approach of the various embodiments of the apparatus disclosed to set forth the concepts of the present invention, in the inventive method the jaws are moved so as to generate the path having a locus selected from the group of hypotrochoids and epitrochoids. The locus along the sealing pattern is controlled, as mentioned above, to be made slightly convex, thus providing the gradual entry and exit of the sealing jaws with respect to each other. In any of the embodiments, this not only increases the pressure as the jaws approach the center of the sealing pattern, but serves to minimize the noise by eliminating the clash of parts.

In the case of the method establishing the preferred hypotrochoid path, the locus is generated by an operative point offset from the center along the output shaft and along the radius of the pinion meshing with the outer drive gear, such as a stationary ring gear. In accordance with the method and in concert with the cross sealing apparatus of the present invention, the offset of the operative point of the preferred embodiment of the method is approximately 25% of the pinion radius, and the integer drive ratio of the drive gear with respect to the pinion is 5:1, thus generating a 5-sided polygon, or a pentagon. As with the apparatus, the sealing pattern in the method defines one side and the return pattern defines the other four sides, with the sides being connected by small arcs. For each fill bodily movement of the pinion around the drive gear during carrying out the method, there are multiple rotations of the pinion; i.e. the total rotations of the pinion match the integer drive ratio, such as 2:1–6:1 or higher.

In conjunction with the cross sealing, there is provided for the preferred apparatus/method of the present invention a companion fill motion, positive stripping action. In the preferred embodiment illustrating either hypotrochoidal or epitrochoidal paths of movement, the face of a carrier for the pinion supporting the output shaft may include a cam track around its periphery. The cam track operates a cam follower that through preferably mechanical linkage is connected to a blocking or crum bar, and through a separate, distinctive linkage to a stripper bar. After each charge or batch of product passes the sealing jaws on its way to the bottom of the tube, the cam track and related separate linkages move the blocking and stripping bars in unison against the plastic tube ahead of the sealing jaw movement. The combination of cam track and linkages are operative to maintain the blocking bars in position during the stripping and subsequent sealing portions of the bagmaking operation so that late arriving product and/or crums is prevented from entering the seal area. Simultaneously, the cam track and stripper bar linkage serves to initially position its operative end up between the sealing jaws, and then rapidly move the stripper bars together and downwardly between the jaws to clear the seal area in the bag prior to the sealing jaws coming together for sealing.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
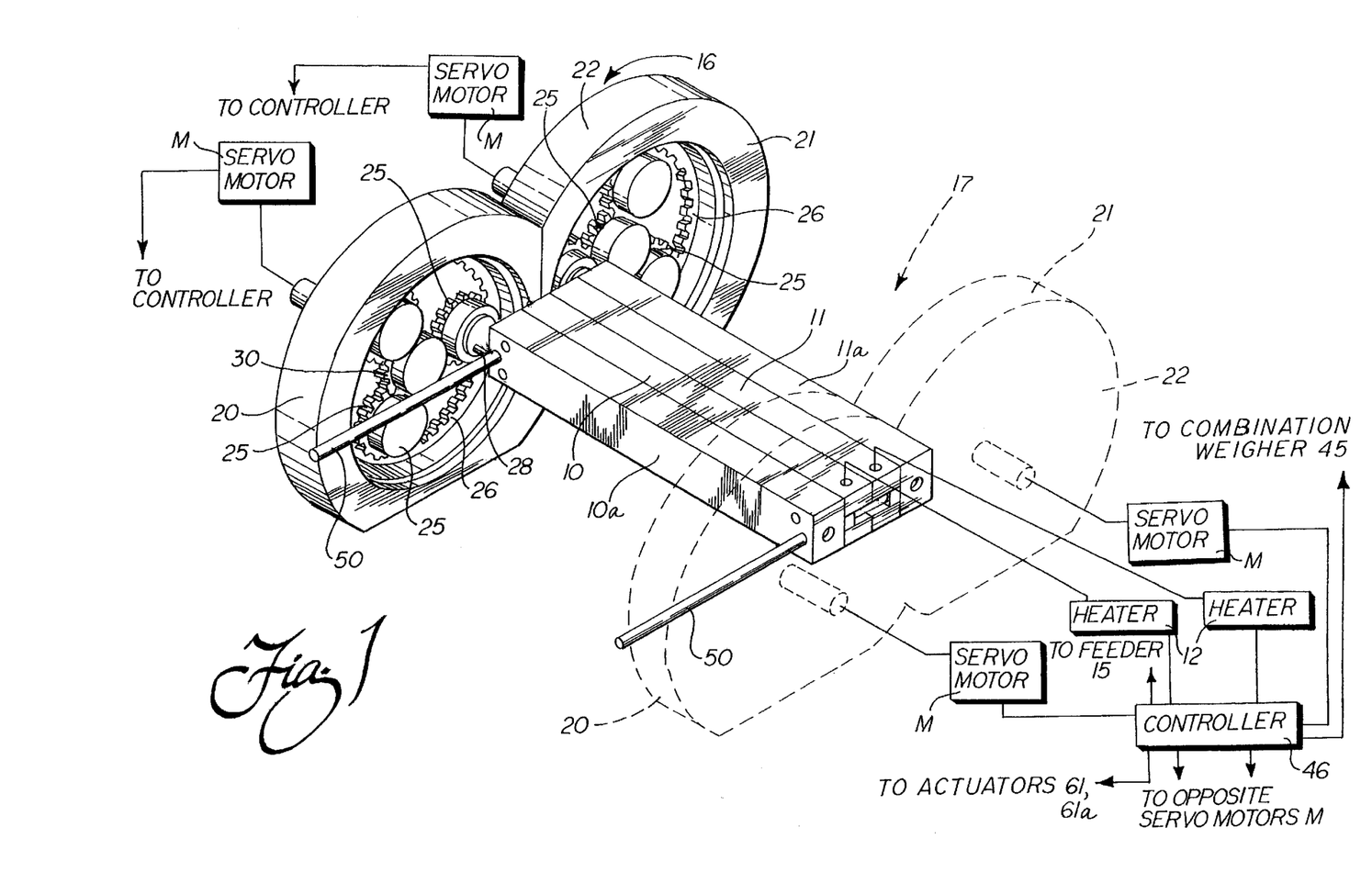
FIG. 1 is a schematic view of the cross sealing apparatus of the present invention illustrating one embodiment of laterally spaced drive units (one in dashed line outline), with the two units incorporating two sets of dual gear assemblies, each set for supporting and moving one sealing jaw, mounted on a bridge, and the gear assembly illustrated incorporating a driving center or sun gear and three pinion or planet gears, rotating and bodily moving around a stationary ring gear, and with the ring gear/pinion ratio of 3:1 and an offset output shaft at about 50% of the pinion from the center to establish a hypotrochoidal path.

In the overall schematic illustration of FIG. 1, there is shown our new approach for mounting and moving sealing jaws 10, 11 toward and away from each other for cross sealing a plastic tube, or similar material handling action. Sealing jaws 10, 11 are mounted on support bridges 10a, 11a. A heater 12 for each of the sealing jaws is provided to cause the plastic material of the packaging tube being sealed to weld together, as is known in the art. A feeder 15 (see also FIG. 6) is provided for feeding packaging tube T continuously along a longitudinal path between the jaws 10, 11. Dual drive units 16 (left side full line version) and 17 (dashed line version on the right hand side) incorporate the concepts of the present invention that allow the sealing jaws 10, 11 to provide continuous 360° sealing jaw 10, 11 movement and overcome the shortcomings and deficiencies of the prior art, as explained above. Each drive unit can be driven by multiple servo motors M, as illustrated in this figure, or as set forth in the preferred embodiment a single drive motor $M_1$, that is operative through a single input shaft for each drive unit 16, 17, can be employed.

The two laterally spaced and opposite gear assemblies 20, 21 support and move the respective sealing jaw/bridge combinations 10, 10a and 11, 11a, respectively. In accordance with the objectives of the present invention, the movement is broadly in a polygonal path. One side of that path establishes the substantially continuous sealing pressure between the jaws 10, 11, as will be seen more in detail below.

In the particular embodiment illustrated in FIG. 1, the mechanism driven by the servo motor M employs one or more pinions 25, operating in the nature of planet gears in a planetary gear set. Each pinion 25 meshes with an outer, stationary ring gear 26; each pinion rotating in one direction, while at the same time bodily moving in the opposite direction around said ring gear 26.

One manner of providing an offset output shaft from the pinion 25, is to incorporate a shaft extending from a solid center of the pinion 25, as illustrated by the output shaft 28 in FIG. 1. It will be understood that the distal end of the shaft 28 mates with an end of the adjacent bridge 10a, 11a and is carried by a rotary bearing so that the pinion 25 can rotate relative to said bridge. A center drive or sun gear 30 meshes with the pinion/planet gears 25, and is of course connected with the servo motors M, as illustrated. The three pinions 25 inside the ring gear 26 establishes a gear to pinion ratio based on pitch circle diameter of 3:1. The output shaft is positioned at about 50% of the pinion radius from its center, thus generating a hypotrochoidal movement. It will now be apparent that the dual gear assemblies 20 and the dual gear assemblies 21 cooperate with each other at the lateral ends of the bridges 10a, 11a, respectively, to support and move the sealing jaws 10, 11 toward and away from each other as a full 360° motion is generated.

Figure 1A:
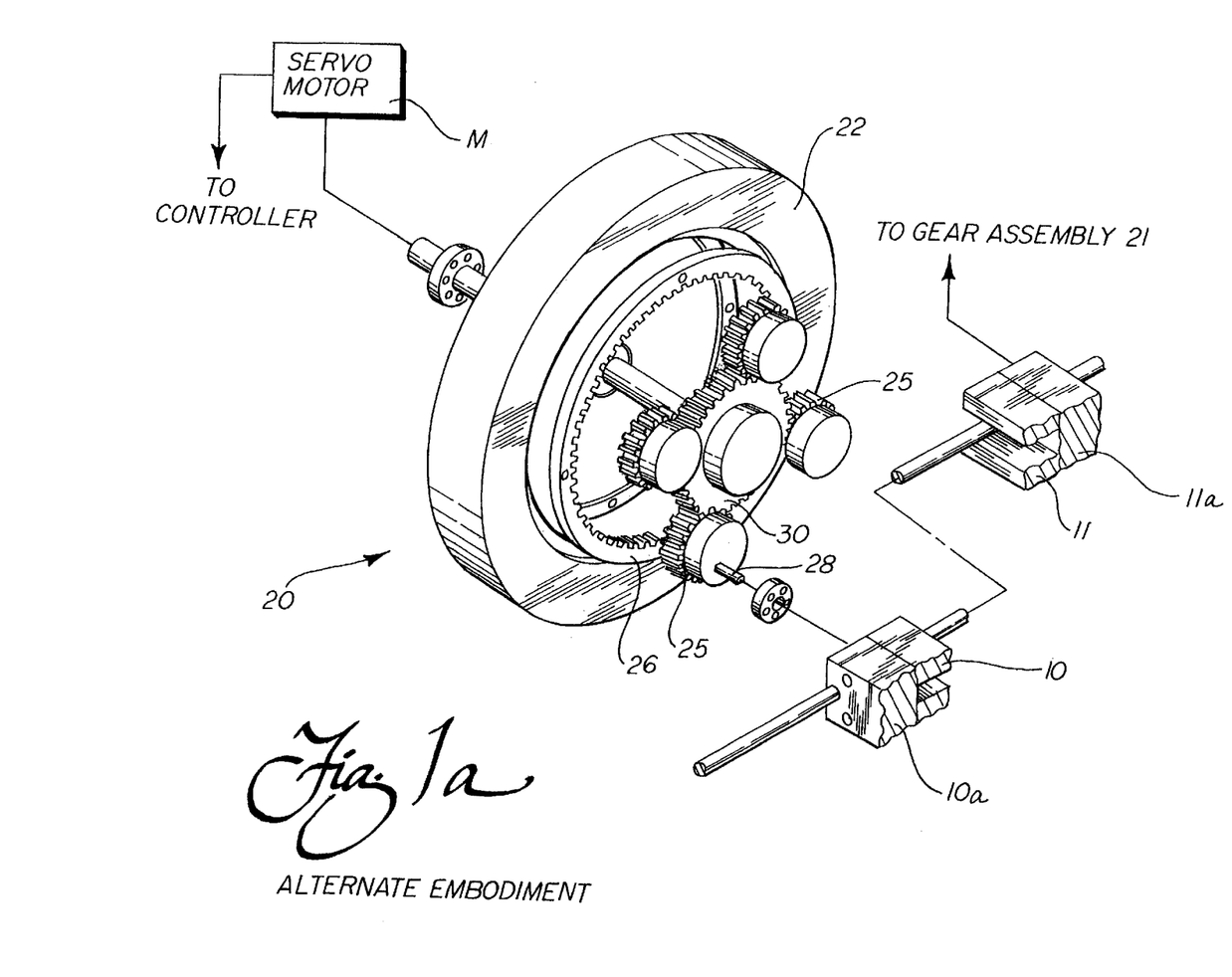
FIG. 1a is an exploded view of a similar single gear assembly of one drive unit, with the other gear assemblies being omitted for clarity, and illustrating in simplistic form the bridge carried by a rotary bearing on an offset output shaft, and wherein a hypotrochoidal path is also generated utilizing a similar driving or sun gear and one or more pinion or planet gears rotating around a fixed ring gear in a 4:1 ratio.

A similar alternative embodiment of a planetary-type gear set to carry out the driving motion for the sealing jaws 10, 11, is shown in FIG. 1a. In this instance, the center driving or sun gear 30 also serves to rotate the pinion or planet gears 25 as they mesh with the outside ring gear 26. Whereas in the FIG. 1 embodiment each of the pinions 25 rotates three revolutions for each cycle of bodily movement around the ring gear 26, in this FIG. 1a embodiment, the pinions 25 are smaller and the drive gear 30 is larger in order to mesh with them, and the ratio of pinion 25 rotation around the ring gear 26 is 4:1. In other words, in the FIG. 1a embodiment, the ratio of the pitch circle diameter of the ring gear 26 to the pitch circle diameter of the pinion 25 is 4:1.

Figure 2:
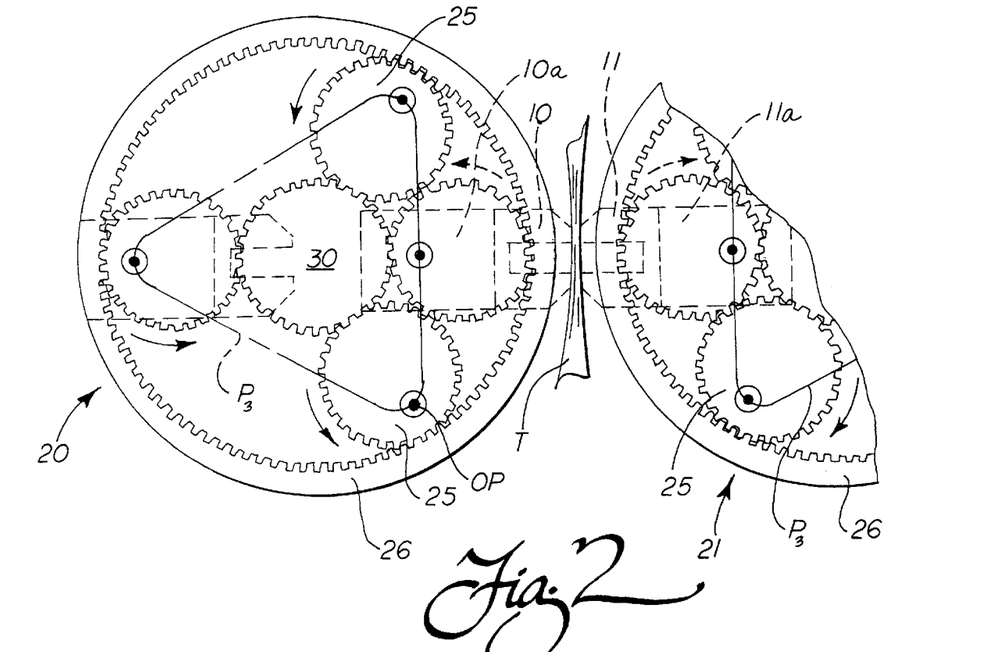
FIG. 2 is a cut away, simplified view of the gear assembly of FIG. 1 providing the hypotrochoidal path of movement established by the 3:1 ratio thus generating a locus defining a triangle with one side forming the substantially linear sealing pattern along the sealing zone and the other two sides forming the return pattern of movement.

With reference now to FIG. 2 of the drawings, there is a clearer illustration of the embodiment of FIG. 1 wherein each pinion 25 is rotating in one direction (note counter-clockwise action arrows), while at the same time bodily moving around the ring gear 26 in the opposite or clockwise direction. For each three rotations of the pinion 25, it makes a fill revolution around the ring gear 26. Taking the operative point OP that corresponds to the offset output shaft 28 as a point of reference, this composite rotary action generates a polygonal path $P_3$, as illustrated. As clearly shown, the polygon in this instance is an equilateral triangle and forms a substantially linear sealing pattern of movement in the sealing zone where the sealing jaws 10, 11 come together to seal the tube T of packaging film. This linear pattern is repeated two times along the polygonal path $P_3$ during the return pattern of movement away and back towards the tube T (see FIG. 2). In this manner, the jaws 10, 11 are highly effective to rapidly form multiple seals in sequence during repeated sealing cycles. The mechanism is relatively simple, is very low in relative mass and moves without requiring a sudden reversal of direction, as is needed in a packaging machine using an oscillating carriage of the prior art.

The triangular track of the operating point OP is naturally generated, not forced so as to move effortlessly through the repeated cycles of sealing and return patterns. As viewed in FIG. 2, with the pinion 25 moving bodily in a clockwise direction down toward the sealing zone, it will be noted that this one movement is automatically offset by its counter-clockwise rotary motion.

It should be noted that the direct mounting and movement of the jaws 10, 11 to generate these substantially linear patterns and parallel path along the sealing zone is carried out without rotating arms or cams that have occupied the back and forth contributions of inventors in this field in the past.

Because the sealing jaws/bridges 10, 10a and 11, 11a are supported for rotary motion with respect to the pinions 25, we have included a pair of guide rods 50; one end of the guide rods being fixed to the bridge 11a, and the other sealing jaw and bridge 10, 10a having an aperture sufficiently large to allow sliding action along the guide rods (see FIG. 1). As a result, as the two sealing jaws 10, 11 are counter-rotating, the sealing jaws remain parallel and properly oriented for forming the sealing function. This can be seen by viewing the two dash lined positions of the sealing jaw 10 of the gear assembly 20 in FIG. 2; one position at the center of the sealing pattern and the second position halfway through the return pattern.

Figure 3:
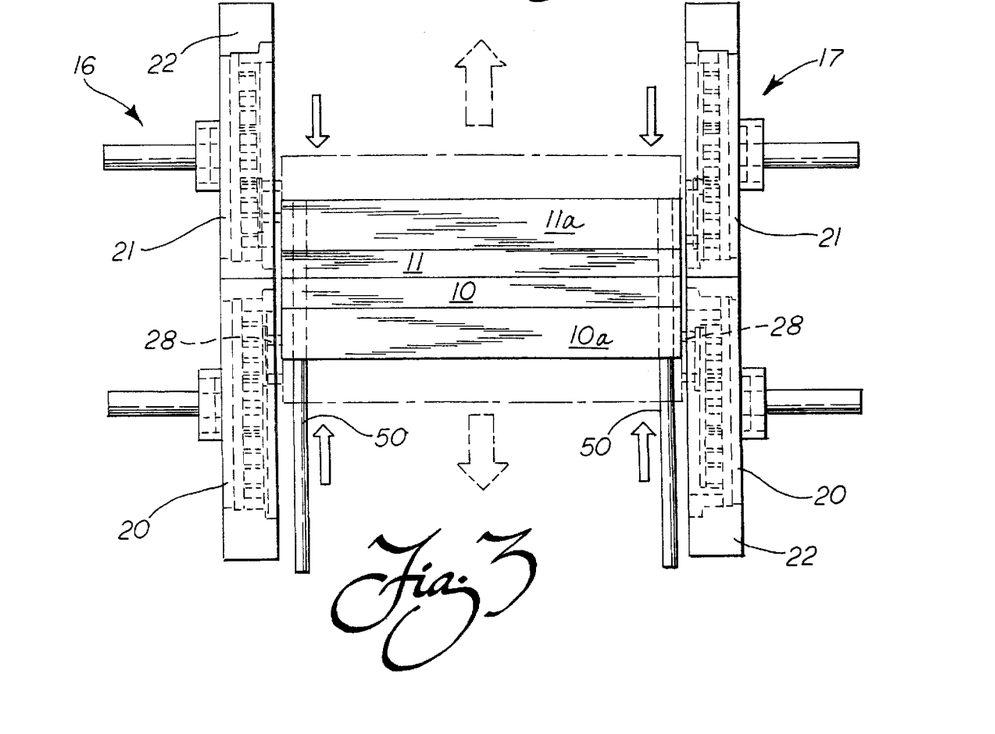
FIG. 3 is a top view illustrating the in and out movement of the sealing jaws in response to the supporting and driving gear assemblies of the laterally spaced drive units, the two sets of dual gear assemblies being shown in dashed line form, and depicting the embodiment of FIGS. 1 and 2.

FIG. 3 is illustrative of the movement of the sealing jaws 10, 11, as viewed from above. The four solid, outboard action arrows depict movement of the jaws together to the sealing position, as occurs by tracking of the operative point OP from the top pinion 25 position, as viewed in FIG. 2, to the bottom pinion 25 position in the same figure. The dash lined action arrows depicted in the center of the jaws provide an indication of the movement of the sealing jaws 10, 11 as the pinion 25 moves along the path $P_3$ away from and back toward the sealing zone in readiness for the next sealing cycle.

Thus from the detailed description so far, it can be seen how the jaws 10, 11 are moved along a polygonal path P and having a locus to define the multiple substantially linear motions. Of greatest importance is the linear motion along the sealing zone where the tube T is being sealed, as viewed in FIG. 2. As illustrated, this polygonal path $P_3$ is a closed figure bounded by the straight lines illustrated, and with the transition between each of the straight lines being formed by minor or small arcs. Furthermore as depicted, the substantially linear lines of the path are slightly convex so that as the sealing jaws 10, 11 traverse the sealing zone there is a rapid, but gentle engagement so as to minimize the shock loading and noise. Equally important is the controlled disengagement of the sealing jaws 10, 11 as the sealing jaws leave the zone. Furthermore, at the crown of the substantially linear pattern of movement through the sealing zone, the squeezing pressure is optimized as it is gradually increased by the minor convex shape and then decreased. These features taken together assist in generating a highly efficient sealing action through the sealing zone.

In each of the embodiments of FIGS. 1–3, the polygonal path is established by the operative point OP tracking to define a hypotrochoidal locus. Specifically, as mentioned above and best viewed in FIG. 3, to do this the output shaft 28 is offset along the radius from the center of the pinion 25; the offset being approximately 50% of the pinion radius. As will be apparent, the particular offset can be varied slightly in order to modify the exact shape of the polygonal path $P_3$ including to adjust to the desired convexity. With the pitch circle diameter or drive ratio between the ring gear 26 and the pinion 25 being 3:1, as discussed above, the hypotrochoidal locus thus generates the triangle path, with the sealing pattern defining one side along the sealing zone and the return pattern defining the two sides as the jaws move away from and back toward each other for the next cycle.

With respect to the alternative embodiment of FIG. 1a, the offset of the output shaft 28 is approximately 40% from the center along the pinion radius and with the drive ratio being 4:1. The locus generates a square with the sealing pattern defining one side and the other three sides defining the return pattern of movement.

Figure 4:
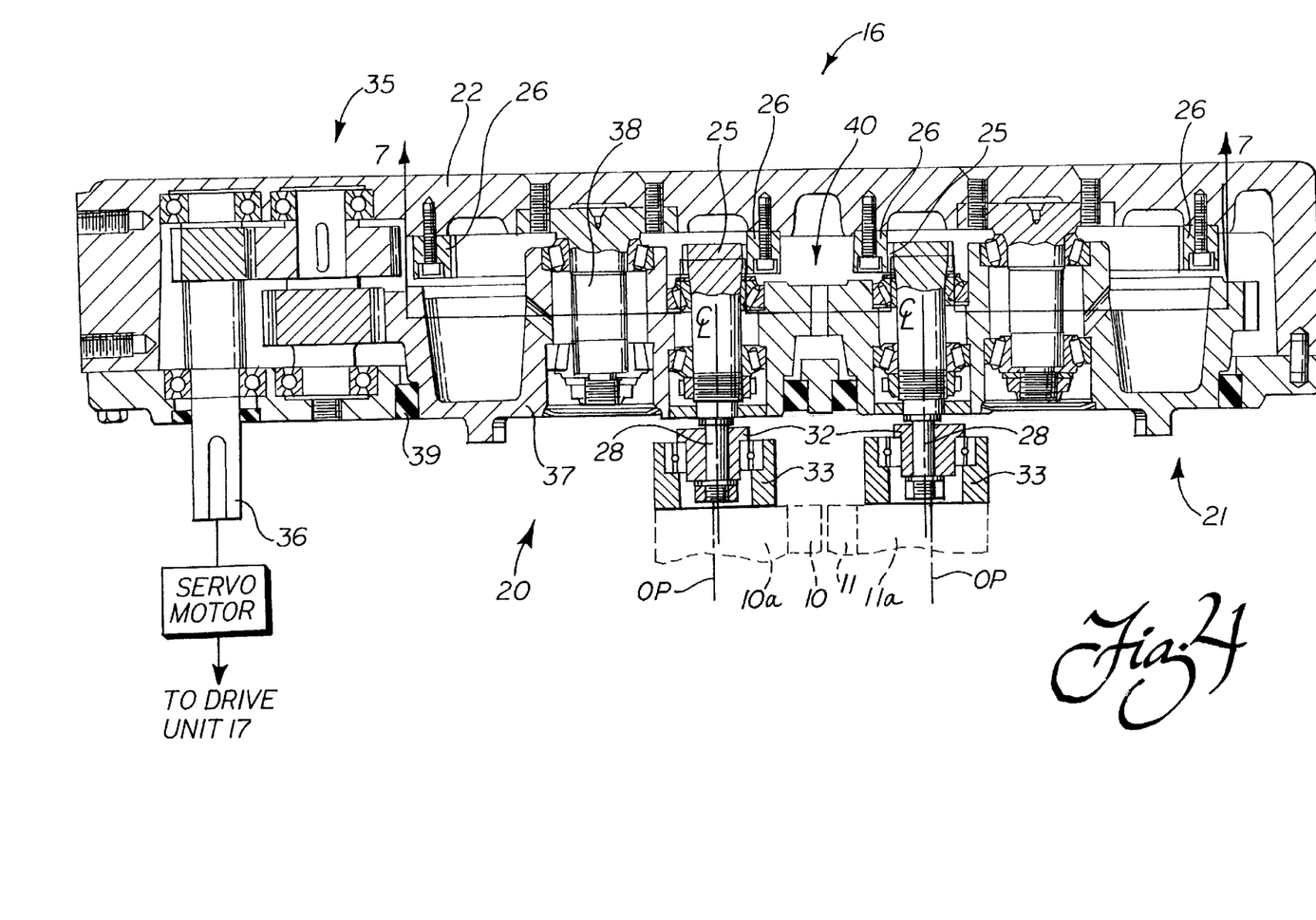
FIG. 4 is a cross sectional view of the preferred embodiment of one drive unit, and in particular illustrating the gear assemblies (5:1 ratio) of the unit providing a hypotrochoidal path of movement, a cam sleeve and rotary bridge mounting collar giving an offset operative point on the output shaft at about 25% of the radius of the pinion from the center, and with the gear assemblies being driven in synchronization and through a speed reduction drive train by a single servo motor for both drive units.

Referring now to FIG. 4 of the drawings, a drive unit, generally designated by the reference numeral 16 is illustrated in cross section. As will be apparent, the drive unit 16 incorporates both the drive assembly 20 and the drive assembly 21, and operates on the same basic principles as the previous two embodiments. Keeping this fact in mind, the housing 22 serves to mount the output shafts 28, which are shown in the position for bringing the sealing jaws/bridges 10, 10a/11, 11a together in the sealing zone (see dashed line outlines). The inner end of each shaft 28 has the operating pinion 25 meshing with the stationary ring or drive gear 26. At the other or distal end of each drive shaft 28 is incorporated a cam or eccentric shaped sleeve 32 and a rotatably mounted bridge mounting collar 33. Since the non-enlarged side of the cam sleeves 32 are facing toward each other, which corresponds to the sealing zone as depicted by the dashed line position of the sealing jaws 10, 11, the operative point OP is spaced from the center line of the respective shaft 28 away from the sealing zone to allow the sealing jaws 10, 11 to be in sealing engagement. In other words, this position corresponds to the position of the sealing jaws in the center of the sealing pattern of movement, as can best be seen in FIG. 5.

In accordance with the preferred embodiment, servo motor $M_1$ drives the common input shaft 36, which through a drive train 35 serves as a speed reduction to the rotation of carrier 37. For example, as illustrated, an initial drive reduction of 2:1 is provided by the meshing gears involving the input shaft 36, and a drive reduction of 4:1 is provided between the meshing gears involving the carrier 37, for a total reduction of 8:1. The carrier 37 is supported on a center support shaft 38 and an annular seal 39 for the housing 22 is provided. A driving transfer interface 40 interconnects the two rotating carriers so that the sealing jaws 10, 11 are maintained in synchronism. Furthermore, the opposite drive unit 17 has a similar input shaft 36 (not shown) and is driven by the single servo motor $M_1$ assuring fill synchronization of the sealing jaws during operation.

The drive ratio of the stationary ring or drive gear 26 with respect to the pinion 25 is 5:1. To put it another way, the pitch circle diameter of the ring gear 26 is five times the pitch circle diameter of the pinion 25, or the circumference of the pitch circles have a ratio of 5:1. Thus, the pinion 25 makes five rotations around the inside of the stationary ring gear 26 for each sealing cycle. Thus, the polygonal path $P_5$ traced by the operative point OP (see FIG. 5) provides for five substantially linear patterns of movement along said path; i.e. one substantially linear sealing pattern occurs at the sealing zone, as shown in FIG. 5, and four additional substantially linear patterns occur to generate the return movement away from and back towards the tube T.

Figure 6:
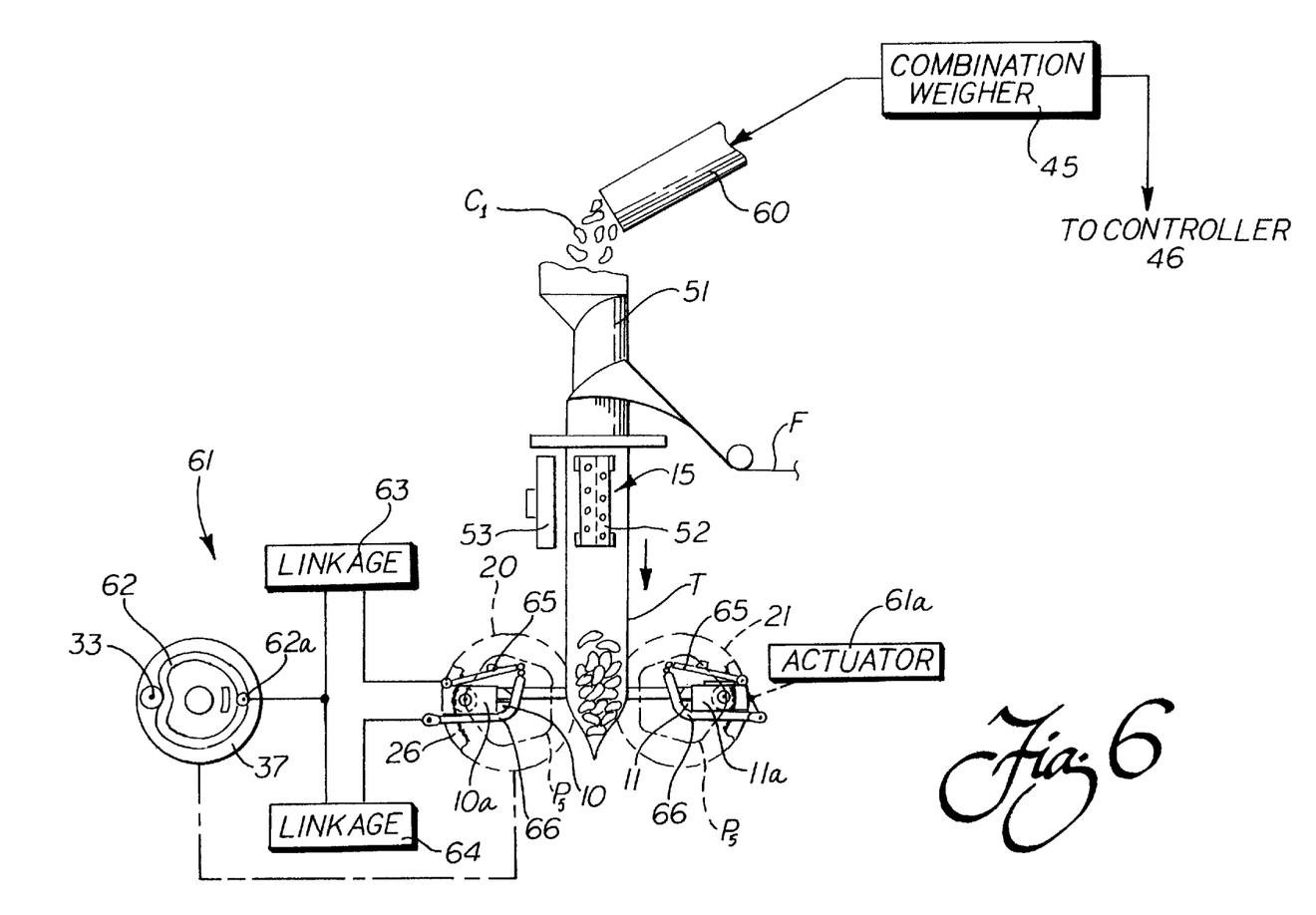
FIG. 6 is an overall schematic view of a typical form-fill-seal packaging system similar to the system illustrated in applicant's prior U.S. Pat. No. 5,540,035, and showing the companion blocking and stripper bars in conjunction with an actuator that employs a cam track on a carrier face of at least one of the gear assemblies of FIG. 5, and operative for driving separate linkages to generate distinctive motions for the bars.

In FIG. 6, the manner in which the drive gear assemblies 20, 21 with the sealing jaws 10, 11 are integrated into a complete packaging machine is illustrated. A combination weigher 45 is operated in conjunction with controller 46 that also synchronizes the operation of the other functions, including the driving of the sealing jaws by the one or more servo motors M, $M_1$. A chute 50 receives each weighed charge or batch of product C, $C_1$, such as potato chips. The charge enters filling tube 51, which in turn is operative to guide the chips into the plastic tube T being sealed to form bag B. Vacuum belts driven by rollers are positioned on opposite sides of the tube T, as represented by the belt 52 shown in this figure. Also, a longitudinal seamer 53 is provided in accordance with standard machine construction.

Figure 5:
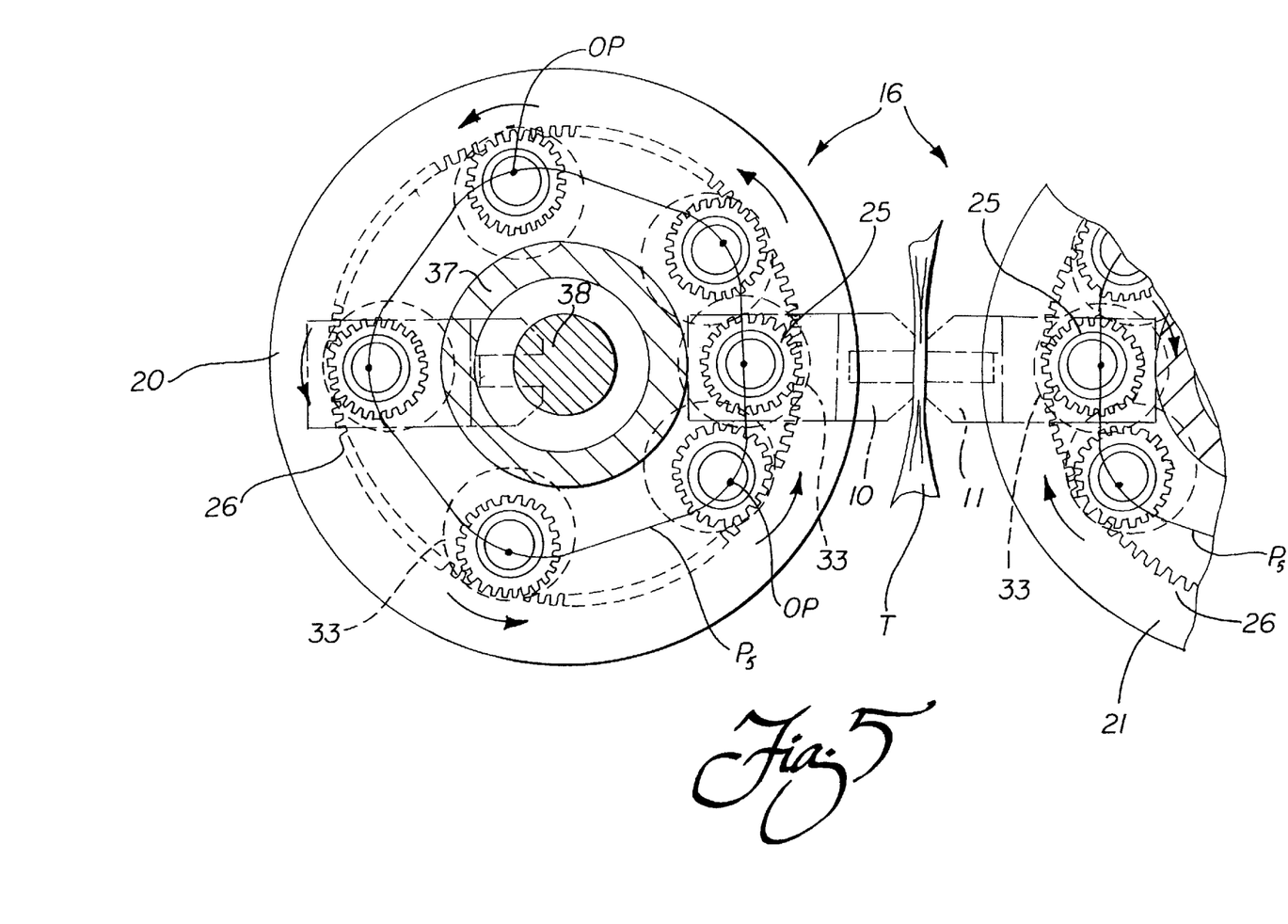
FIG. 5 is a simplified showing of the ring gear of one gear assembly in conjunction with a broken away showing of the other gear assembly of the drive unit of FIG. 4, and illustrating through the 5:1 ratio, a pentagon path generated with the substantially linear sealing pattern forming one side along the sealing zone and the other four sides defining the return pattern of movement, as well as depicting the slight convexity of the patterns.

The dual gear assemblies 20, 21 are generally illustrated by dashed line outline as well as the polygonal path $P_5$ of the FIGS. 4–5 embodiment. Mounted on the bridge 10a, 11a of the sealing jaws 10, 11 are mechanisms for blocking the passage of late arriving product or crumbs, and for stripping the product within the tube T as the tube continues to be fed through the sealing zone between the sealing jaws. To do this, actuators 61, 61a are employed and may comprise a cam track 62 mounted on the face of the corresponding carrier 37 (see FIG. 4 also). A common cam follower 62a is connected to separate and distinctive first and second linkages 63, 64. In turn, the linkages are connected respectively to a blocking or crum bar 65 and a stripper bar 66. Accordingly, as the carriers 37 of the drive assemblies 20, 21 of the FIGS. 4, 5 embodiment rotate, the cam follower 62a moves along the respective cam 62 and activates each of the linkages 63, 64.

Figure 7A:
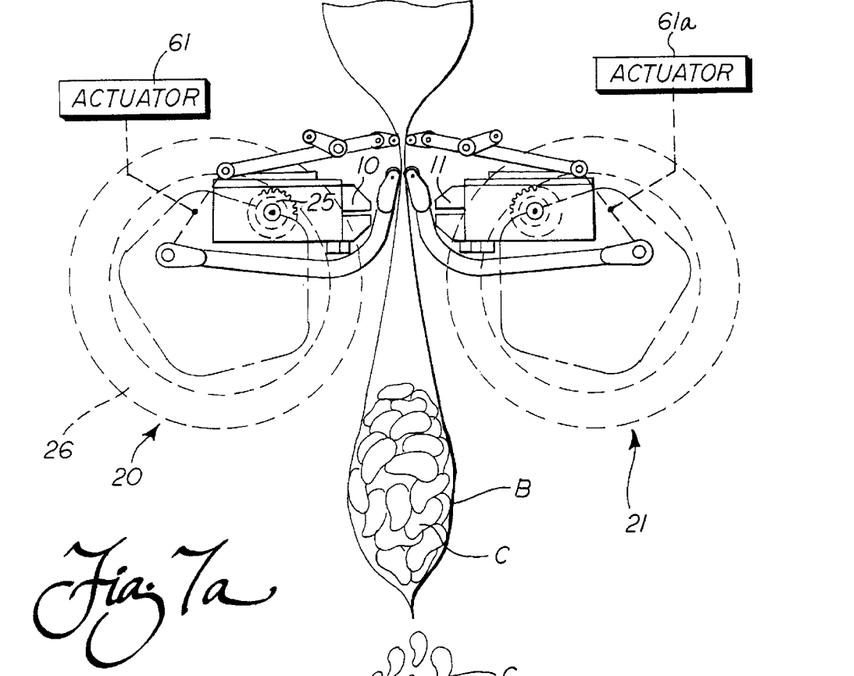
FIGS. 7a–7d illustrate in enlarged and greater detail the sequential operation of the companion blocking and stripper operations carried out in response to the actuators of the type illustrated in FIG. 6.
Figure 7B:
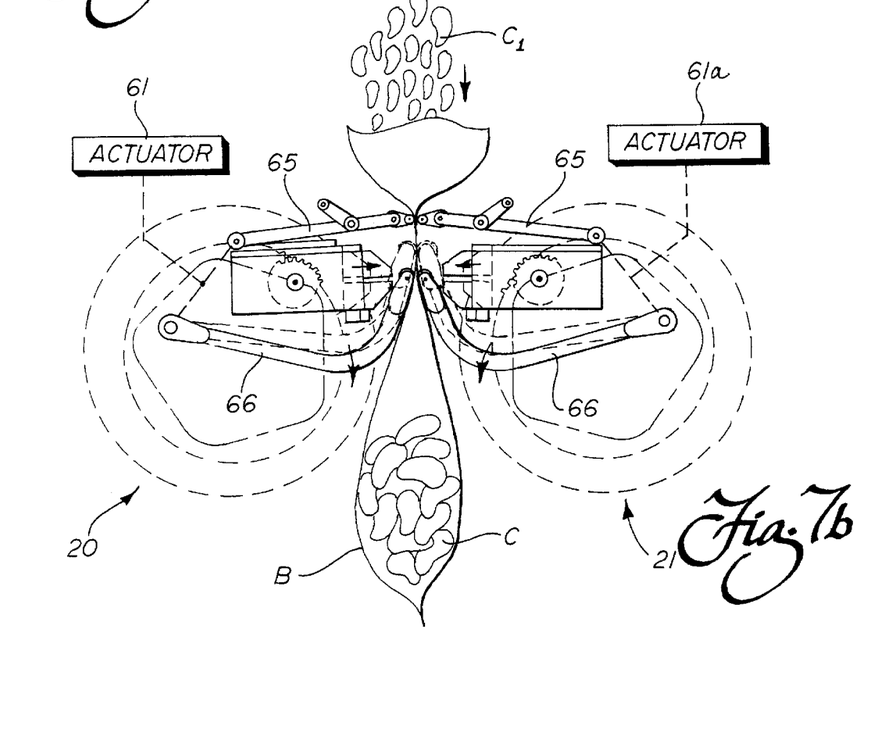
Figure 7C:
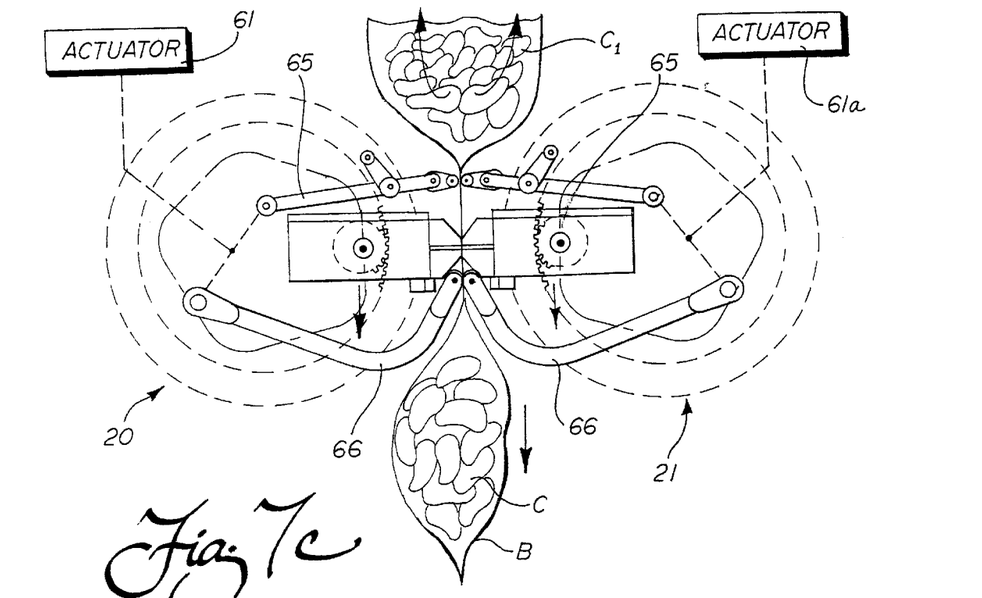
Figure 7D:
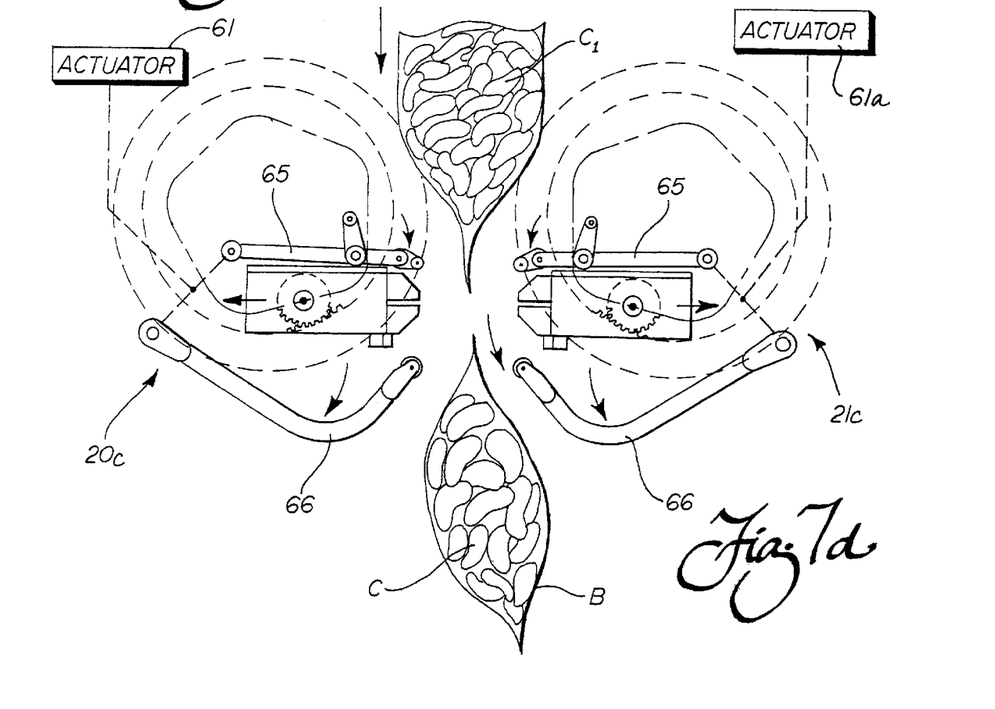

As can best be seen starting in FIG. 7a, the linkage 63 (shown only in FIG. 6) is operative to move the blocking bar against the tube T as bag B is being formed below with initial charge C now in place. Similarly, linkage 64 is operative to position the stripper bar 66 upwardly between the sealing jaws 10, 11 and immediately begin downward movement for stripping any product within the bag B out of the seal area. In FIG. 7b, the actuators 61, 61a continue to be operative as the carriers 37 continue to rotate. The individual and distinctive linkage 64 moves the stripper bars 66 downwardly in a rapid fashion clearing the sealing jaws and outdistancing the continuously moving tube T through the sealing zone, as best shown in FIG. 7c. The sealing jaws 10, 11 come together and now perform the sealing function. Finally, in FIG. 7d, the sealing jaws complete the seal, the cut-off knife (not shown) within one of the sealing jaws performs its function and the bag B with the charge C of product is released. The next packaging cycle is now ready to be performed on the bottom of the continuously descending tube T with the new charge $C_1$, in it. Upon completing the 7d step, the cam track 62 and cam 62a are operative through the linkages 63, 64 to return the bars 65, 66 to the home position along with the sealing jaws 10, 11, as shown in FIG. 6.

In all of the FIGS. 1–7, the selected movement is based on the gear assemblies 20, 21 that generate a hypotrochoidal locus from movement of the operative point OP that is offset from the center of the output shaft 28 and pinion 25 (see FIGS. 2 and 5 that depict the effective triangle and pentagon versions).

Figures 8, 8A:
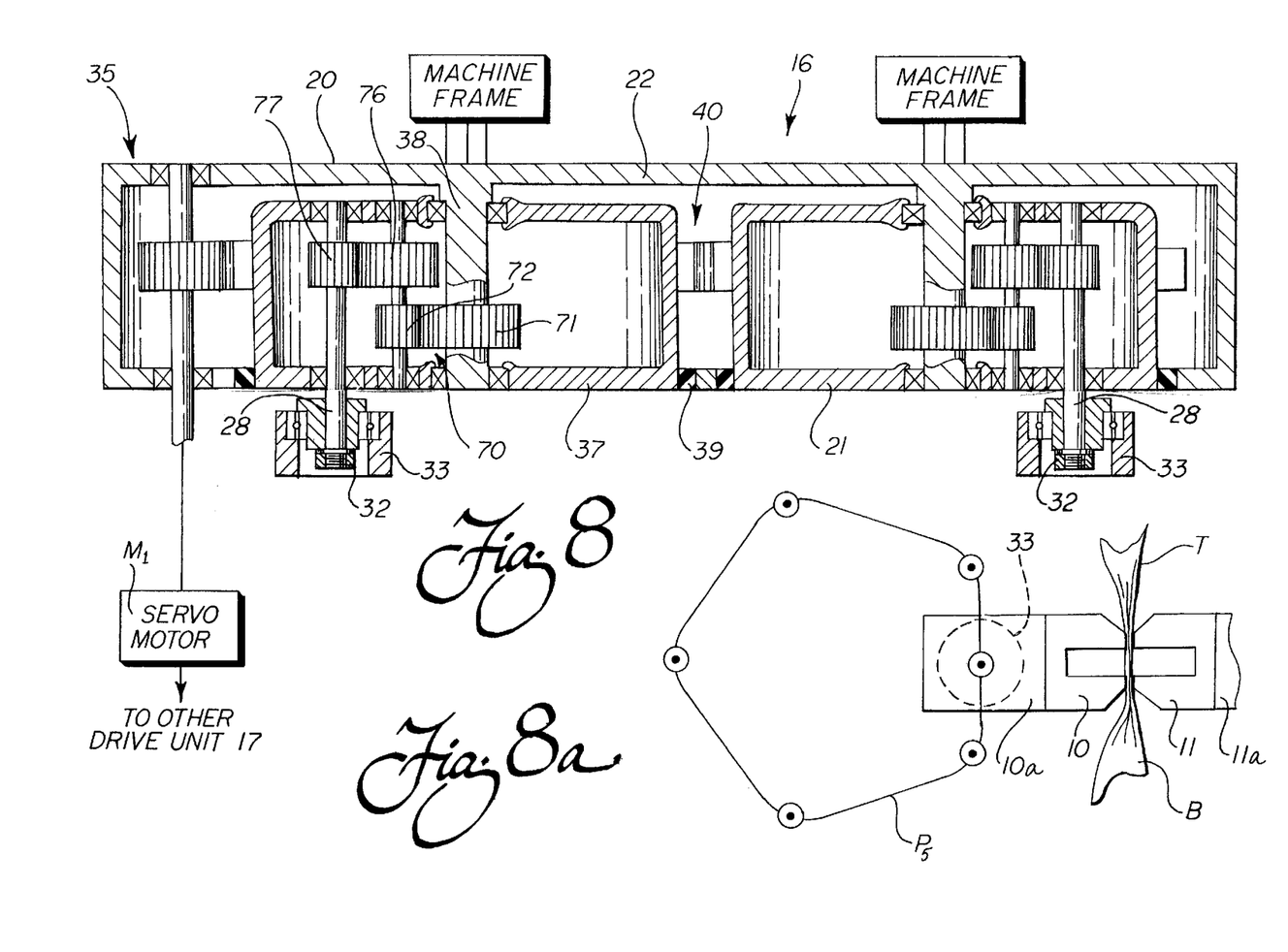
FIG. 8 is a cross section through a drive unit of an alternative embodiment similar to that in FIG. 4 but utilizing a stationary center or sun gear and a rotating and bodily moving pinion or planet gear, with an intermediate idler gear pair, and with a cam sleeve/rotary mounting collar to offset the output shaft to provide an epitrochoidal locus defining the polygonal path.
FIG. 8a is a simplified view of the movement of the sealing jaw in the polygonal path in the FIG. 8 embodiment and utilizing the 5:1 ratio and output shaft offset of about 25% to generate the pentagon.

FIG. 8 illustrates the epitrochoidal version of the polygonal movement generated through the drive unit 16. The gear assemblies 20, 21 in this embodiment include the housing 22 that carries two rotating output shafts 28, which in this figure are shown withdrawn to the mid-point of the return pattern of movement. Each output shaft 28 carries the cam shaped sleeve 32, which in turn rotatably carries the bridge mounting collar 33. Each carrier 37 rotates within the housing 22 around the stationary shaft 38 with appropriate seals 39 being provided around the periphery. Of course, the gear assemblies 20, 21 are coupled together by the driving interface 40.

A stationary drive gear 71 in the nature of a sun gear is provided on the shaft 38. The gear 71 meshes with an idler pair of gears 72, 76, which in turn serves to rotate the pinion 77 that takes the form of a planet gear within this planetary set. As a result of a 2.5:1 ratio between the pitch circle diameters of the gears 71, 72 and a 2:1 drive ratio between the gears 76, 77, it will be realized that a 5:1 ratio of rotation of the carrier 37 to the output shaft 28 is generated. Since these gear assemblies 20, 21 are rotating around a fixed center gear 71, rather than inside a fixed ring gear 26 of the embodiments of FIGS. 1–7, the epitrochoidal locus is generated to form the polygonal paths of movement between the sealing jaws 10, 11. The drive train 35 can serve as a reduction, such as shown in FIG. 8 of approximately 6:1.

As best seen in FIG. 8a, the track of the operative point OP generated by the epitrochoidal locus described, forms the pentagon path $P_5$, which is substantially identical to the path generated in the FIGS. 4–7 embodiment. The positioning of the bridge mounting collar 33 on the bridge 10a, as well as all of the other basic geometric details, are the same.

Thus, in accordance with the broader aspects of the present invention, drive assemblies 20, 21 generating either the hypotrochoidal or the epitrochoidal locus can be selected, with the same end result in cross sealing of a plastic tube T, or gripping elongated material, both with equal efficiency.

As best seen in FIG. 8a, the track of the operative point OP generated by the epitrochoidal locus described, forms the pentagon path $P_5$, which is substantially identical to the path generated in the FIGS. 4–7 embodiment. The positioning of the bridge mounting collar 33 on the bridge 10a, as well as all of the other basic geometric details, are the same.

In summary, substantial improved results and advantages are gained by use of our new approach that moves away from the conventional counter-rotating arms or cam operated mechanisms to operate form-fill-seal sealing jaws in a continuous 360° fashion. In the various embodiments illustrated, including the embodiments of FIGS. 4–7 and FIGS. 8–8a, the sealing jaws 10, 11 are efficiently moved through a natural motion of gear assemblies without having to be forced, as is prevalent in the prior art arrangements. The dual gear assemblies 20, 21 supporting and moving each of the jaws 10, 11 generate the desired polygonal paths $P_3$, $P_5$, $P_n$. Enhanced heat and sealing pressure control through the extended linear sealing pattern of movement in the sealing zone is obtained. The jaws move effortlessly through the zone, as well as toward and away from it during the remainder of the path. As a result, the jaws 10, 11 are effective to more rapidly and efficiently form multiple seals in sequence during the repeated sealing cycles.

Advantageously, the polygonal paths $P_3$, $P_5$, $P_n$ can be selected based on various integer gear ratios to establish a moving point having a locus selected from the group of hypotrochoids or epitrochoids with equal efficiency. The offset of the output shaft 28 of the pinions 25, 77 selected in these particular embodiments is in the range of about 25% to 50% along the radius from the center of the pinion. When selecting the hypotrochoidal locus forming the path, the pinion 25 rotates around the inside of a stationary ring gear 26 and when the epitrochoidal locus to form the path is selected the pinion 25 rotates around a stationary center gear 71. In either case, no rotating arms, with or without movable axes, or cam and spring operators are required. The natural and efficient mechanical motion of the invention provides for conservation of power, freedom from high stresses and noise and is economical to manufacture and maintain.

The foregoing description of the preferred embodiment of the invention has been presented for purposes of illustration and description. It is not intended to be exhaustive or to limit the invention to the precise form disclosed. Obvious equivalent modifications or variations are possible in light of the above teachings. For example, the gears can be coupled by chains or timing belts, if desired, whereby the functional relationship remains the same. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An apparatus for cross sealing a plastic tube comprising:
   a pair of opposed sealing jaws;
   an energy generator for applying heat to said jaws;
   a feeder for feeding said tube continuously along a longitudinal path between said jaws;
   a controller for synchronizing said tube and said jaws; and
   dual gear assemblies supporting and moving each of the jaws; the movement being in a polygonal path for establishing substantially continuous sealing pressure between said jaws during an unforced, substantially linear sealing pattern of movement along the path, the remainder of the path including a return pattern of movement including at least one substantially linear pattern away and back towards said tube,
   whereby the jaws are effective to rapidly form multiple seals in sequence during repeated sealing cycles.

2. The cross sealing apparatus of claim 1, wherein the gear assemblies drive said jaws along the polygonal path established by points having a locus to define multiple substantially linear motions of said jaws including for the sealing pattern;
   said locus being selected from the group of hypotrochoids and epitrochoids.

3. The cross sealing apparatus of claim 2, wherein is provided an offset output shaft of said gear assemblies that drives said jaws, the locus along the sealing pattern being slightly convex to provide gradual entry and exit of the sealing jaws to increase the pressure and minimize the noise.

4. The cross sealing apparatus of claim 2, wherein said gear assemblies operate to provide a hypotrochoidal locus generated by an operative point offset from the center of an output shaft and with respect to the radius of a pinion rotating around the inside of a stationary ring gear.

5. The cross sealing apparatus of claim 2, wherein is provided an offset of an operative point along the radius of an output shaft and with respect to a pinion meshing with a drive gear, the offset being approximately 50% of the pinion radius, and the drive ratio of said gear to said pinion is 3:1, whereby the locus generates a triangle with the sealing pattern defining one side and the return pattern defining two sides.

6. The cross sealing apparatus of claim 4, wherein is provided an offset of an operative point along the radius of an output shaft and with respect to a pinion meshing with a drive gear, the offset being approximately 40% of the pinion radius, and the drive ratio of said gear to said pinion is 4:1, whereby the locus generates a square with the sealing pattern defining one side and the return pattern defining three sides.

7. The cross sealing apparatus of claim 4, wherein said pinion gear completes a full rotation relative to said ring gear during the sealing pattern of movement and at least one such additional rotation during said return pattern.

8. The cross sealing apparatus of claim 2, wherein said gear assemblies operate to provide an epitrochoidal locus generated by an operative point offset from the center of an output shaft and with respect to the radius of a planet pinion rotating around the outside of a fixed sun gear.

9. The cross sealing apparatus of claim 2, wherein the offset of the operative point along the radius of said output shaft is approximately 25% of the pinion radius, and the ratio of pitch circle diameters is 5:1, whereby the locus generates a pentagon with the sealing pattern defining one side and the return pattern defining four sides.

10. The cross sealing apparatus of claim 8, wherein said pinion completes a full rotation relative to said sun gear during the sealing pattern of movement and at least one such additional rotation during said return pattern.

11. The cross sealing apparatus of claim 1, wherein one of each of said pair of said sealing jaws includes at least one guide rod extending perpendicular to said feed path and an aligned aperture in the other sealing jaw to slidably receive said rod to maintain said sealing jaws parallel during the sealing and return patterns of movement.

12. The cross sealing apparatus of claim 1, wherein is provided at least one servo motor to drive said dual gear assemblies.

13. The cross sealing apparatus of claim 9, wherein a hypotrochoidal locus is generated.

14. The cross sealing apparatus of claim 9, wherein a epitrochoidal locus is generated.

15. A method of cross sealing a continuously moving plastic tube extending between a pair of opposed sealing jaws comprising:
   continuously feeding said tube;
   moving the jaws toward and away from each other in a polygonal path and establishing substantially continuous sealing pressure between said jaws during an unforced, substantially linear sealing pattern of movement along the path, the remainder of the path including a return pattern of movement including at least one substantially linear pattern away and back towards said tube;
   synchronizing said tube and said jaws; and
   energizing said jaws for applying heat along the sealing pattern forming one side of the polygonal path,
   whereby the jaws are effective to rapidly form multiple seals in sequence during repeated sealing patterns of movement.

16. The cross sealing method of claim 15, wherein the step of moving the jaws generates the path having a locus selected from the group of hypotrochoids and epitrochoids.

17. The cross sealing method of claim 16, wherein the locus along the sealing pattern is made slightly convex to provide gradual entry and exit of the sealing jaws to increase the pressure and minimize the noise.

18. The cross sealing method of claim 16, wherein is selected a hypotrochoid having a locus generated by an operative point offset from the center along the radius of a pinion meshing with a drive gear.

19. The cross sealing method of claim 16, wherein the offset of said operative point is approximately 25% of the pinion radius, and the drive ratio of said gear with respect to said pinion is 5:1, whereby the locus generates a pentagon with the sealing pattern defining one side and the return pattern defining the other four sides.

20. The cross sealing method of claim 16, wherein is provided the additional step of completing a full rotation of said pinion relative to said drive gear during the sealing pattern of movement and at least one such additional rotation during said return pattern.

21. An apparatus for cross sealing a continuously moving plastic tube extending between a pair of opposed sealing jaws to form bags for packaging comprising:

means for continuously feeding said tube;

means for moving the jaws toward and away from each other in a polygonal path and establishing substantially continuous sealing pressure between said jaws during an unforced, substantially linear sealing pattern of movement along the path, the remainder of the path including a return pattern of movement including at least one substantially linear pattern away and back towards said tube;

means for synchronizing said tube and said jaws; and means for energizing said jaws for applying heat along the sealing pattern forming one side of the polygonal path,     whereby the jaws are effective to rapidly cross seal the tube to form the bags in sequence during repeated sealing patterns of movement.

22. The cross sealing apparatus of claim 21, wherein said moving means for the jaws generates the path having a locus selected from the group of hypotrochoids and epitrochoids.

23. The cross sealing apparatus of claim 22, wherein the locus along the sealing pattern is made slightly convex to provide gradual entry and exit of the sealing jaws to increase the pressure and minimize the noise.

24. The cross sealing apparatus of claim 23, wherein is selected a hypotrochoid having a locus generated by an operative point offset from the center along the radius of a pinion meshing with a drive gear.

25. The cross sealing apparatus of claim 24, wherein the offset of said operative point is approximately 25% of the pinion radius, and the drive ratio of said gear with respect to said pinion is 5:1, whereby the locus generates a pentagon with the sealing pattern defining one side and the return pattern defining the other four sides.

26. The cross sealing apparatus of claim 25, wherein is provided a full rotation of said pinion gear relative to said drive gear during the sealing pattern of movement and at least one such additional rotation during said return pattern.

* * * * *